US007532342B2

(12) United States Patent
Folkins

(10) Patent No.: US 7,532,342 B2
(45) Date of Patent: May 12, 2009

(54) DYNAMIC IDZ PRECESSION IN A MULTI-PASS DIRECT MARKING SYSTEM

(75) Inventor: Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 937 days.

(21) Appl. No.: 10/691,168

(22) Filed: Oct. 22, 2003

(65) Prior Publication Data

US 2005/0088670 A1 Apr. 28, 2005

(51) Int. Cl.
*G06F 3/12* (2006.01)
*G06F 17/00* (2006.01)

(52) U.S. Cl. ...................... 358/1.15; 358/1.12; 715/251

(58) Field of Classification Search .................. 358/1.1, 358/1.4, 1.8, 1.12, 1.15, 1.18; 226/15; 715/251
See application file for complete search history.

(56) References Cited

U.S. PATENT DOCUMENTS 5,095,342 A 3/1992 Farrell et al.
5,913,018 A * 6/1999 Sela .......................... 358/1.15
5,953,556 A * 9/1999 Yamanaka ................... 399/66
6,009,296 A 12/1999 Nishimura
6,050,191 A 4/2000 Enderle et al.
6,125,258 A 9/2000 Umetani
6,565,192 B1 5/2003 Vinals et al.
6,604,804 B2 * 8/2003 Asawaka ..................... 347/14
6,985,250 B2 * 1/2006 Folkins ...................... 358/1.18
7,426,043 B2 * 9/2008 Folkins ...................... 358/1.12
2003/0128385 A1 7/2003 Folkins
2005/0089349 A1 4/2005 Folkins
2008/0193180 A1 * 8/2008 Shim et al. ................... 358/1.4

OTHER PUBLICATIONS

Unofficial copy of prosecution history of US Patent 6985250.
Unofficial copy of prosecution history US Patent 7426043.
Unofficial copy of prosecution history of U.S. Appl. No. 12/105,125 as of Oct. 7, 2008.

* cited by examiner

*Primary Examiner*—Kimberly A Williams

(57) ABSTRACT

A method for minimizing the Inter-Document Zone (IDZ) in printing system architectures with print engines running at constant speed, employing asynchronous paper delivery; and providing control over paper feed times. The method of the present invention comprising first receiving input electronic data of an image intended to be printed. Then, inspecting said data to determine both the lead edge (L.E.) and the trail edge (T.E.) blank borders of said image. A determination is then made as to whether the blank borders exceed a minimum design distance. If the blank border of the L.E. exceeds the minimum then the process causes the printing of that image to occur sooner. If the blank border of the T.E. exceeds the minimum then the process causes the finishing of printing that image, and the starting of any subsequent images, to occur sooner. This has the advantageous result of generating faster prints per minute with smaller paper to paper timing and identical intermediate substrate pass to pass timing to the nominal design guidelines. This technique varies the page-per-minute (ppm) throughput based on the border margins of each document through timing adjustments. As a result, there are no additional stress placed on any of the image drum subsystems because process speed remains relatively constant.

3 Claims, 7 Drawing Sheets

DYNAMIC IDZ PRECESSION IN A MULTI-PASS DIRECT MARKING SYSTEM

RELATED APPLICATIONS

Cross-reference is made to the following application filed concurrently herewith: (U.S. patent application Ser. No. 10/691,174—now U.S. Pat. No. 7,426,043) entitled "ASYMMETRIC IDZ PRECESSION IN A MULTI-PASS DIRECT MARKING SYSTEM" by Barry J. Thurlow.

Reference is made to commonly-assigned U.S. patent application Ser. No. 10/040,691, filed Jan. 7, 2003, U.S. Publication No. 20030128385 (now U.S. Pat. No. 6,985,250), entitled ALTERNATE IMAGING MODE FOR MULTI-PASS DIRECT MARKING, by Jeffrey J. Folkins, the disclosure(s) of which are incorporated herein.

FIELD OF THE INVENTION

The present invention generally relates to printing system architectures and other direct marking systems such as multi-pass intermediate transfer systems wherein a two pitch intermediate drum architecture is utilized and, more particularly, to those systems and methods for minimizing the Inter-Document Zone (IDZ) in order to effectuate an increase in productivity for print engines running at constant speed.

BACKGROUND OF THE INVENTION

The terminology "copiers," and "copies," as well as "printers" and "prints," is used alternatively herein. The terminology "imaging" and "marking" is used alternatively herein and refers to the entire process of putting an image, from a digital or analog source, onto a target substrate (e.g., paper). The image can then be permanently fixed to the target substrate by fusing, drying, or other means. It will be appreciated that the invention applies to multi-pass, single and multi-pitch marking architectures in any type of digital print system, including, but not limited to systems in the fields of incremental printing of symbolic information, photocopying, facsimile, and electro-photography. Digital print systems are also referred to by many technical and commercial names within these fields, including: electro-photographic (e.g., xerographic) printers, copiers, and multifunction peripherals; digital presses; laser printers; and ink-jet printers.

Digital print systems include paths through which sheets of a target substrate that are to receive an image are conveyed and imaged (i.e., the paper path). The process of inserting sheets of the target substrate into the paper path and controlling the movement of the sheets through the paper path to receive an image is referred to as "scheduling."

One type of a multi-pass marking architecture is used to accumulate composite page images from multiple color separations. On each pass of the intermediate substrate, marking material for one of the color separations is deposited on the surface of the intermediate substrate until the last color separations is deposited to complete the composite image. Another type of multi-pass marking architecture is used to accumulate composite page images from multiple swaths of a print head. On each pass of the intermediate substrate, marking material for one of the swaths is applied to the surface of the intermediate substrate until the last swath is applied to complete the composite image. Both of these examples of multi-pass marking architectures perform what is commonly known as "page printing" once the composite page image is completed by transferring the full page image from the intermediate substrate to the target substrate.

Multi-pass printing may be scheduled in what may be referred to as "burst mode." When scheduling in "burst mode," sheets are inserted into, imaged, and output from the paper path at the maximum throughout capacity of the print system without any "skipped pitches" or delays between each consecutive sheet. A "pitch" is the portion (or length) of the paper path in the process direction which is occupied by a sheet of the target substrate as it moves through the paper path. A "skipped pitch" occurs when there is a space between two consecutively output sheets which is long enough to hold another sheet. Various methods for scheduling in burst mode known in the arts but are directed toward scheduling problems regarding duplex printing and integration of print engines with finishing devices.

In a multi-pitch marking architecture, the surface of the intermediate substrate (e.g., intermediate transfer drum or belt) is partitioned into multiple segments, each segment including a full page image (i.e., a single pitch) and an inter-document zone. For example, a two pitch drum is capable of printing two pages during a pass or revolution of the drum. Likewise, a three pitch belt is capable of printing three pages during a pass or revolution of the belt. In a multi-pitch, multi-pass marking architecture, traditional "burst mode" scheduling starts accumulating images for each pitch of the intermediate substrate at the beginning of a print job and on the final pass of the multi-pass cycle each composite image is transferred to a target substrate.

However, problems can arise when attempting to transfer multiple composite images from the intermediate substrate, e.g., intermediate transfer drum or belt, to the target substrate, e.g., paper, during the same pass. These problems are primarily associated with integration of the intermediate substrate/transfer station with adjacent stations, e.g., preheating or other type of pre-conditioning stations and fusing stations, in the paper path. This is particularly a problem in a high-speed print system. For example: i) preceding stations, e.g., preheating or pre-conditioning stations, may not be able to operate properly if the target substrate is advanced at the same speed as in the transfer station, ii) likewise, successive stations, e.g., fusing stations, may not be able to receive the transferred sheets as fast as the transfer station can output them, iii) alternatively, to make the adjacent stations capable of such operation they may become unacceptably large and/or economically cost prohibitive. Furthermore, registration of sheets in the paper path to the composite page images on the intermediate substrate may not be sufficiently reliable if it is performed at the same speed as sheets advancing through the transfer station.

In many direct marking systems, particularly in multi-pass intermediate transfer systems, utilizing a two pitch intermediate drum architecture direct marking Solid Ink Jet (SIJ), Piezo Ink Jet (PIJ) to print at high speeds, page speed is often determined by jetting frequency, resolution in dots per inch (dpi), and/or the size of the inter-document zone (IDZ), i.e., the non-image or non-document zones or portions of the circumference of the intermediate drum. The result of such architecture gives rise to issue of setting the IDZ to a minimum with respect to image placement rather than paper placement. The reduction of the-lDZ tends to increase print speed.

The IDZ is generally tied to drum size, i.e., average IDZ=(½ drum circumference) minus image width for a two document pitch drum. The nominal IDZ and drum size are chosen by, among other things, the ability to perform certain transition functions in IDZ time defined, in part, by: lateral or "x-axis" print head drive motion, the transfix roll engagement, and the Drum oiling and Maintenance (DMU) engagement. These subsystems preferably perform their intended actuations in the allocated IDZ time and space.

Some architectures are designed such that there is a blank border on the lead and trail edges of each document. Typically such a mandatory blank border might be 5 mm. However, many customer designed documents and originals actually have significantly larger borders, e.g., the Microsoft Word application defaults to 15-25 mm borders. Even though many systems are designed for the occasional 5 mm border, one can take advantage of the predominantly larger border of most documents while shortening the IDZ. Unfortunately, the drum must be sized for the smallest border. Furthermore, since in multi-pass intermediate direct marking architectures image drum passes must be synchronized with each other on the drum, there is little opportunity to reduce the IDZ within a document page. However, since the placement of successive documents need not be necessarily synchronized, the IDZ can be reduced wherever image borders allow; especially in systems wherein IDZ constraints are placed on image spacing rather than paper spacing.

What is needed in this art is a method of minimizing the inter-document zone in print architectures providing control over paper feed times including piezoelectric ink jet architectures and other xerographic systems and for those architectures employing asynchronous paper delivery.

BRIEF SUMMARY OF THE INVENTION

A method for minimizing the Inter-Document Zone (IDZ) in printing system architectures with print engines running at constant speed, employing asynchronous paper delivery; and providing control over paper feed times. The method of the present invention comprising first receiving input electronic data of an image intended to be printed. Then, inspecting said data to determine both the lead edge (L.E.) and the trail edge (T.E.) blank borders of said image. A determination is then made as to whether the blank borders exceed a minimum design distance. If the blank border of the L.E. exceeds the minimum then the process causes the printing of that image to occur sooner. If the blank border of the T.E. exceeds the minimum then the process causes the finishing of printing that image, and the starting of any subsequent images, to occur sooner. This has the advantageous result of generating faster prints per minute with smaller paper to paper timing and identical intermediate substrate pass to pass timing to the nominal design guidelines. This technique varies the page-per-minute (ppm) throughput based on the border margins of each document through timing adjustments. As a result, there are no additional stress placed on any of the image drum subsystems because process speed remains relatively constant.

DESCRIPTION OF THE SPECIFICATION

Figure 1:
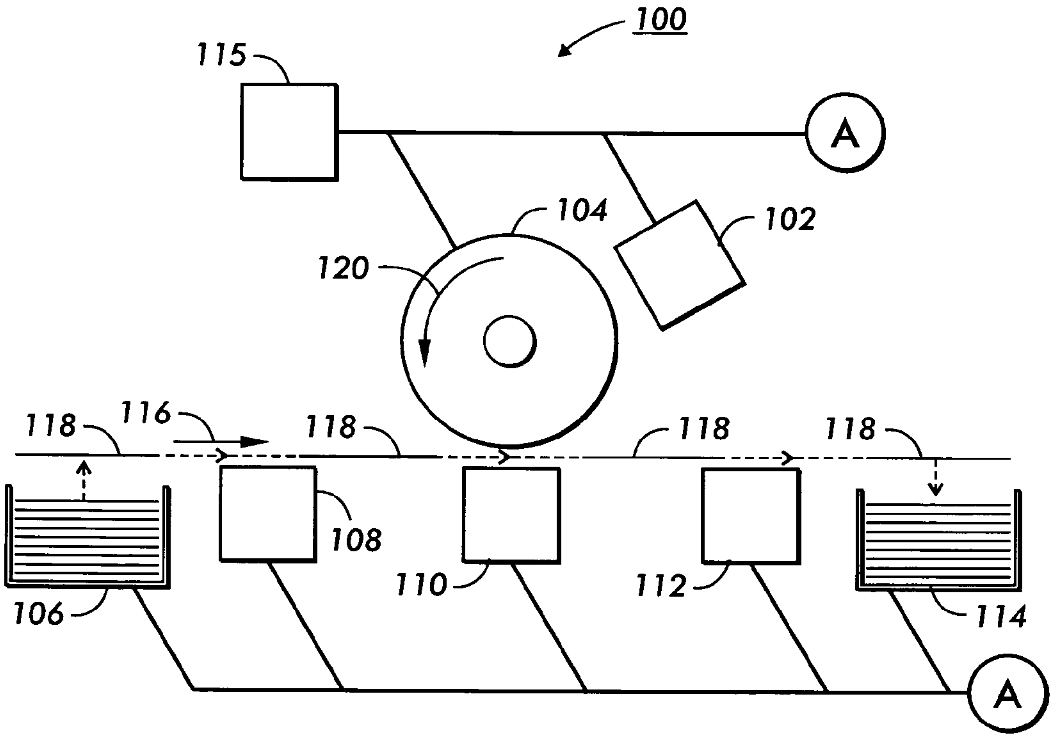
FIG. 1 is a diagram of the typical marking material and paper-handling components of a print system related to the present invention.

With reference now being made to FIG. 1 illustrating the typical marking material and paper handling components of print system 100. The print system is preferably an ink-jet printer based on ink marking technology. Alternatively, the print system can be a xerographic printer based on toner marking technology or another type of printer based on marking technology similar to toner or ink marking. The marking material and paper handling components shown are marking material applicator 102, intermediate substrate 104, feeding bin 106, pre-conditioning station 108, transfer station 110, fusing station 112, collection bin 114, and controller 115. Paper path 116 shows sheets of target substrate 118 advancing from feeding bin 106, through pre-conditioning station 108, transfer station 110, and fusing station 112 to collection bin 114. The pre-conditioning station is preferably a pre-heater for heating the target substrate to a predetermined temperature prior to transferring the marking material from the intermediate substrate 104 to the target substrate. Alternatively, the pre-conditioning station can be another type of conditioning station used in conjunction with ink or toner marking technologies. For example, in toner marking technology, a charging station may be used to apply a predetermined electrical charge to the target substrate prior to transferring toner from the intermediate substrate. The intermediate substrate is preferably a rotating drum. Alternatively, the intermediate substrate can be a moving belt or another assembly capable of performing the desired function in a similar manner to the drum or belt.

Controller 115 is operationally coupled to each station along paper path 116 and controls advancement of the target substrate from feeding bin 106 through each station (108-112) to collection bin 114. Likewise, the controller is also operationally coupled to intermediate substrate and marking material applicator 102 and controls movement of the intermediate substrate in process direction 120 during the processing of a print job. The marking material applicator, under control of the controller, deposits marking material on intermediate substrate as the substrate moves in the process direction. The marking material deposited on the intermediate substrate is based on image processing of the page to be printed.

The marking material applicator is preferably a print head based on solid ink and piezoelectric technologies. Alternatively, the print head can be based on other ink marking technologies capable of performing the desired function in a similar manner. In still another alternative, in the color REaD (Recharge, Expose and Development)-type xerographic printer system, the marking material applicator can be a charging, image exposure, and developer station or another assembly capable of performing the desired function in a similar manner. In this case the intermediate substrate is a photo-conductive medium. In still another alternative, in the color tandem-type xerographic printer system, the marking material applicator can be a charging, image exposure, development station with a rotating photo-conductive substrate that transfers marking materials onto the intermediate substrate. Additional alternatives that incorporate multiple marking material applicators are also contemplated.

Advancement of target substrate 118 is coordinated with movement of the intermediate substrate by the controller so that the page image, i.e., the deposited marking material, and a target substrate sheet meet at the transfer station 110. The marking material is transferred from the intermediate substrate to the target substrate at the transfer station. The target substrate sheet continues advancing to the fusing station wherein the marking material is permanently affixed to the target substrate sheet. Thereafter, the target substrate sheet continues advancing to the collection bin.

Figure 2:
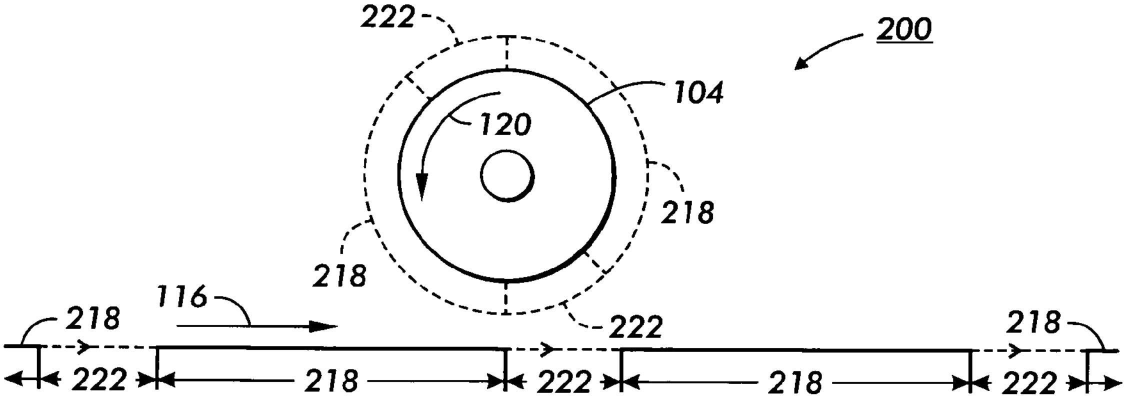
FIG. 2 is a diagram of pitches on the intermediate substrate and along the paper path of FIG. 1.

Reference is now being made to FIG. 2, illustrating print system 200 which implements a two-pitch marking architecture using the marking material and paper handling components of FIG. 1. Alternatively, the print system can be comprised of other components capable of implementing two-pitch marking. Also shown are pitches 218 on intermediate substrate 104 along the paper path of FIG. 1. A pitch is the dimension of the target substrate in the process direction.

The intermediate substrate must be of a sufficient circumference or other exterior dimension to permit two-pitch printing of the desired target substrate. Knowing the dimensions of the surface of the intermediate substrate and the dimensions of the target substrate, the controller partitions the surface into four areas: two pitch areas 218 and two inter-document areas 222. The two pitch areas are based on the dimension of target substrate in the process direction. While the two inter-document areas are based on the remaining area on the surface of the intermediate substrate.

By way of example, a drum with a circumference of 565.5 mm (22.25 in) can implement two-pitch printing of standard A-size (215.9 mm (8.5 in.) by 279.4 mm (11 in.)) paper. In doing so, the drum is partitioned into two pitch areas of 215.9 mm (8.5 in.) and two inter-document areas of 66.85 mm (2.625 in.). Variations of multi-pitch marking, e.g., three-pitch, four-pitch, etc., may be implemented when the size of the target substrate is reduced or if the size of the intermediate substrate is increased.

Continuing, similar to partitioning the intermediate substrate the controller also divides paper path 116 into pitch areas and inter-document areas. However, the dimensions of any given pitch area and inter-document area in the paper path are based on the speed at which the target substrate is advanced through that portion of the paper path. If the target substrate is advanced at the same speed as the surface of the intermediate substrate, the pitch area and the inter-document area in the paper path is the same dimension as those on the surface of the intermediate substrate. However, if the target substrate is advanced more slowly, the pitch area and the inter-document area in the paper path are larger than those on the surface of the intermediate substrate.

Figure 3:
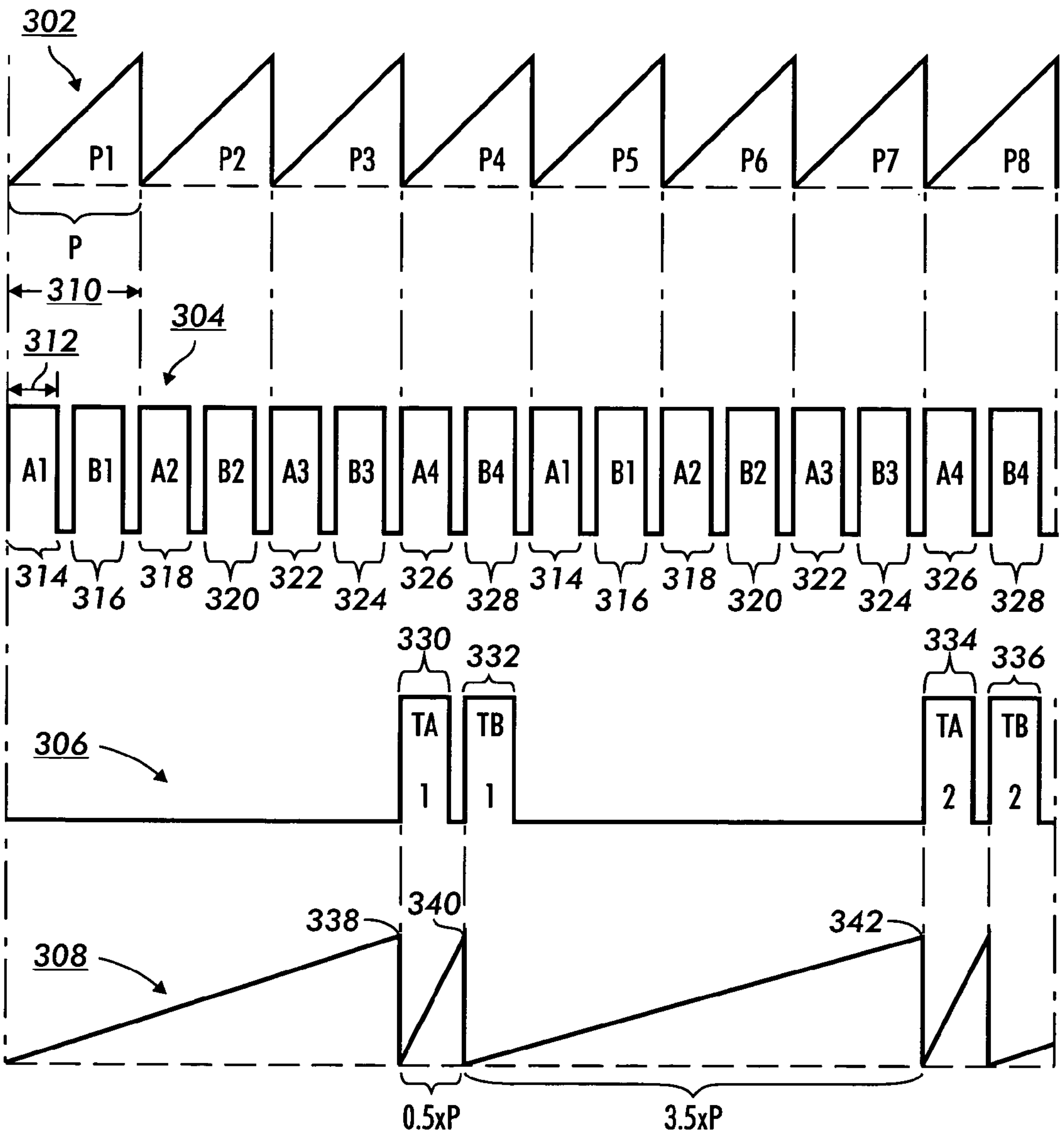
FIG. 3 is a timing diagram for a two-pitch, four-pass pass marking architecture that schedules print jobs in "burst mode".

With reference now being made to FIG. 3, a timing diagram is shown for a two-pitch, four-pass marking architecture that schedules print jobs in what is referred to herein as "burst mode." Also shown therein are periodic saw-tooth waveform 302, square pulse train 304, repeating dual square pulse sequence 306, and repeating dual saw-tooth pulse sequence 308. The periodic saw-tooth waveform represents passes, i.e., revolutions, of the intermediate substrate 104. The square pulse train represents activation of the marking material applicator 102 by controller 115. The repeating dual square pulse sequence represents activation of the transfer station 110 by the controller. The repeating dual saw-tooth pulse sequence represents target substrate 118 demand at the transfer station.

With continued reference to FIG. 3, the intermediate substrate begins moving in the process direction 120 at the beginning of a print job in order to begin imaging the first page. Each cycle of the saw-tooth waveform ("P") 310 represents a revolution or pass of the intermediate substrate. The diagram reflects eight passes (8P), numbered sequentially P1-P8. In actuality, the intermediate substrate continues to move until the print job is complete. A pass (P) is a useful reference for timing operations and will be used in the following discussion for relative and proportional comparisons (e.g., 0.5P, 3.5P). The two-pitch, four-pass marking architectures of FIGS. 1 and 2 require four passes of the marking material applicator over each of the pitch areas to completely mark the composite image. The four passes can either apply four swaths or four color separations of the composite image.

Where it is based on four swaths, the desired composite resolution and the resolution of each swath of applicator 102 are considered. For example, if the desired resolution is 600 dots per inch (dpi) in a four-pass architecture then the resolution of the marking material applicator is 150 dpi. After each pass, the applicator is moved in the X, i.e., cross-process, direction by the controller and the resolution of the composite image becomes 600 dpi from the accumulation of four 150 dpi swaths. Alternatively, where four passes apply four color separations, each color separation is applied in successive passes, for instance, cyan, magenta, yellow, and black color separations applied in successive passes. Other techniques that complete the composite image in four passes are also contemplated, including print systems with multiple marking material applicators.

Each pulse 312, of FIG. 3, in square pulse train 304 represents activation of marking material applicator by the controller. In the two-pitch, four-pass marking architecture, the applicator is activated twice during each pass P of the intermediate substrate; one activation for each pitch area. For clarity, the two pitch areas on the intermediate substrate are referred to hereinafter as pitch-A and pitch-B. Furthermore, it is assumed that the applicator encounters pitch-A and then pitch-B during each pass P. Pitch-A represents the first page and subsequent odd pages of a print job and pitch-B represents the second page and subsequent even pages.

In "burst mode," applicator 102 begins depositing marking material on both pitch-A and pitch-B during pass P1. This is reflected by applicator activation pulses A1 314 and B1 316. As first and second page imaging continues, pulses A2 318 and B2 320 represent activation of the applicator during pass P2. Likewise, pulses A3 322 and B3 324 represent activation during pass P3 and pulses A4 326 and B4 328 represent activation during pass P4. After the fourth pass, the applicator begins another identical four-pass cycle for the third and fourth pages of the print job. The applicator continues to be activated in like fashion until the print job is complete.

Each pulse (e.g., 330) in the dual square pulse sequence 306 represents activation of the transfer station 110 by the controller. After the start of A4 326, transfer of the pitch-A composite image to target substrate 118 can begin. Accordingly, a target substrate sheet advancing along paper path 116 is coordinated to meet with the composite image as it reaches transfer station 110. Transfer of the composite image is performed during transfer station activation pulse TA1 330. Note that the duration of pulse TA1 330 is substantially the same as an applicator activation pulse 312 because the target substrate and the surface of the intermediate substrate are moving at substantially the same speed during the transfer operation. Also note that in actuality the transfer station activation pulse TA1 330 lags the fourth applicator activation pulse A4. The amount of lag depends on the actual positions of the applicator and the transfer station. For example, in the print system of FIG. 1 the applicator is shown at 2 o'clock and the transfer station at 6 o'clock with respect to the intermediate substrate. This would result in an approximate delay of 0.67P from pulse A4 326 to pulse TA1 330. Each transfer station activation pulse would lag its corresponding fourth applicator application pulse in like fashion.

After the start of B4 328, transfer of the pitch-B composite image to a target substrate can begin. Accordingly, a second target substrate sheet advancing along the paper path is coordinated to meet the composite image as it reaches the transfer station. Transfer of the composite image is performed during the transfer station activation pulse TB1 332. Presuming the print job includes third and fourth pages, the transfer station is activated again in identical fashion after the start of A4 326 and B4 328 in pass P8. Transfer station activation for the third and fourth page images are represented by pulses TA2 334 and TB2 336, respectively.

Each pulse (e.g., 338) in the dual saw-tooth pulse sequence 308 represents target substrate demand at the transfer station. In "burst mode," it is important to note that the second target substrate sheet is demanded approximately 0.5P revolutions of the intermediate substrate 104 after the first target substrate sheet 118 was demanded. This is reflected by saw-tooth pulses 338 and 340, which align with the beginning of transfer station activation pulses TA 1 330 and TB 1 332, respectively. In contrast, the third target substrate sheet is demanded approximately 3.5P revolutions after the second target substrate sheet. This is reflected by saw-tooth pulses 340 and 342, which align with the beginning of transfer station activation pulses TB 1 332 and TA 2 334, respectively. This pattern of odd numbered sheets demanded approximately 0.5P revolutions after even numbered sheets and even number sheets demanded approximately 3.5P revolutions after odd numbered sheets continues until the print job is complete. The disparity between alternating demands of 0.5P and 3.5P revolutions of the intermediate substrate is perhaps emphasized by the following example. If the intermediate substrate is a drum with a circumference of 565.5 mm (22.25 in.) and the drum is rotated at 1400 mm/sec. (55 in./sec.), each pass (P) is 0.4 sec. in duration and the transfer station alternates between demanding target substrate sheets in 0.2 sec. (0.5P) and 1.4 sec. (3.5P).

Figure 4:
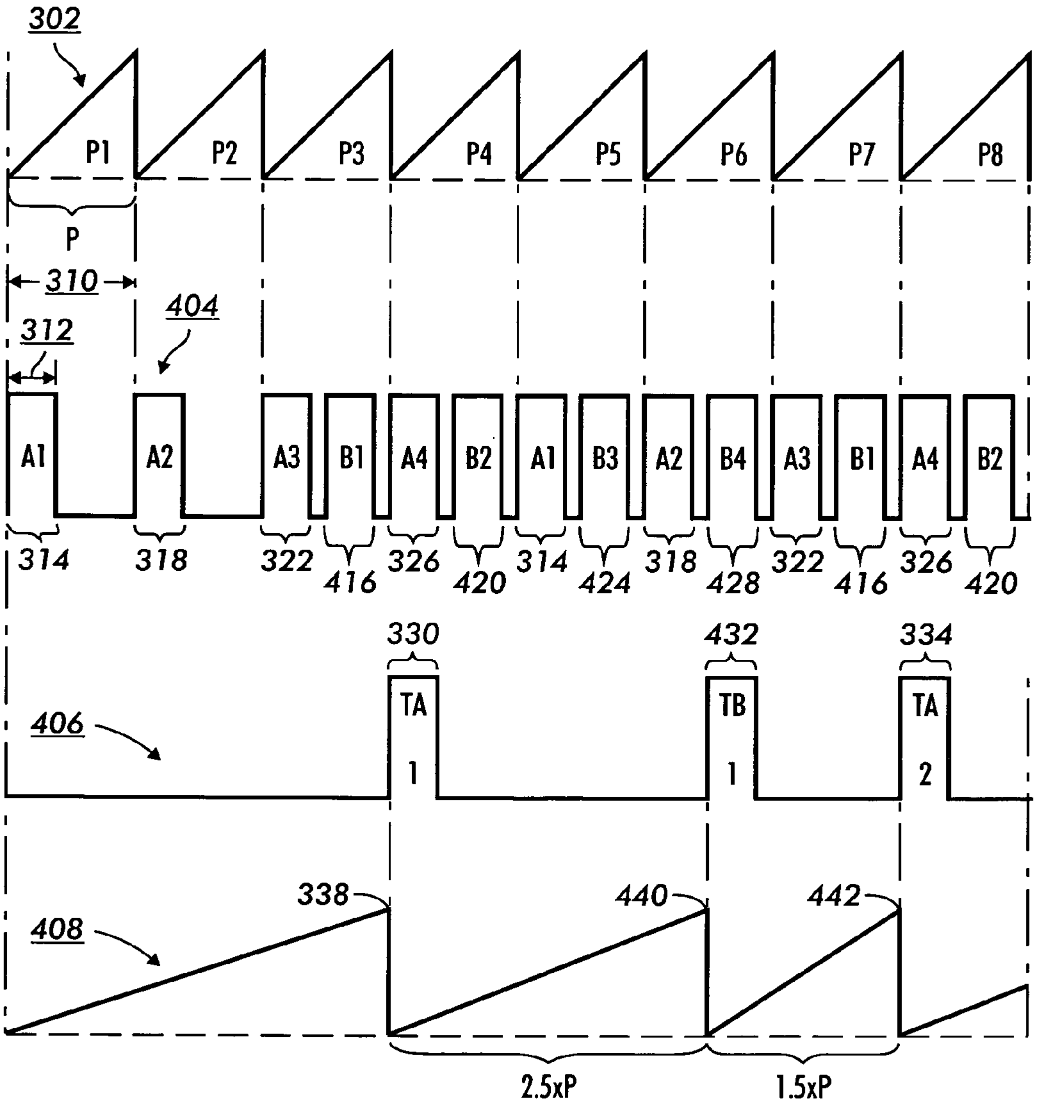
FIG. 4 is a timing diagram for a two-pitch, four-pass marking architecture that schedules print jobs in an "alternate imaging mode" in accordance with an embodiment of the present invention.

Reference is now being made to FIG. 4 showing a timing diagram for a two-pitch, four-pass marking architecture that schedules print jobs in an "alternate imaging mode." As in FIG. 3, the timing diagram of FIG. 4 includes periodic saw-tooth waveform 302, square pulse train 404, repeating dual square pulse sequence 406, and repeating dual saw-tooth pulse sequence 408. The intermediate substrate moves in the same manner for FIG. 4 as described for FIG. 3. Accordingly, the periodic saw-tooth waveform 302 and a pass P 310 of the intermediate substrate in FIG. 4 are identical to that of FIG. 3.

As in FIG. 3, each pulse 312 in the square pulse train 404 of FIG. 4 represents activation of marking material applicator 102 by controller 115. The marking material applicator is activated in essentially the same manner as described in FIG. 3. Accordingly, FIG. 4 also refers to the two pitch areas 218 on the intermediate substrate as pitch-A" and pitch-B with the distinction that FIG. 4 employs "alternate imaging mode" rather than "burst mode" scheduling.

In "alternate imaging mode," the applicator begins depositing marking material on pitch-A during pass P1 and delays beginning pitch-B imaging until pass P3. This is reflected by applicator activation pulses A1 314 during pass P1. During pass P2, first page imaging continues with pulse A2 318. During pass P3, first page imaging continues and the applicator begins depositing marking material on pitch-B as reflected by pulses A3 322 and B1 416. During pass P4, first page and second page imaging continues with pulses A4 326 and B2 420. During pass P5, second page imaging continues on pitch-B and the applicator begins another identical four-pass cycle for the third page of the print job on pitch-A as reflected by pulses B3 424 and A1 314. During pass P6, second and third page imaging continues with pulses B4 428 and A2 318. The applicator continues to be activated in like fashion until the print job is complete.

As in FIG. 3, each pulse (e.g., 330) in the dual square pulse sequence 406 of FIG. 4 represents activation of the transfer station by the controller. After the start of A4 326, transfer of the pitch-A composite image to a target substrate can begin. Transfer of the pitch-A composite image is performed in FIG. 4 as in FIG. 3 as reflected by transfer station activation pulse TA1 330, which occurs at the same point. Transfer of the pitch-B composite image to a target substrate can begin after the start of B4 428 as reflected by transfer station activation pulse TB1 432. However, in FIG. 4 the applicator activation pulse B4 begins during pass P6 rather than during pass P4 as in FIG. 3. Presuming the print job includes third and fourth pages, the transfer station is activated again in identical fashion after the start of A4 326 in pass P8 and after the start of the fourth marking pass over pitch-B in pass P10 (not shown). Transfer station activation for the third page image is represented by pulse TA2 334. Also as in FIG. 3, each pulse (e.g., 338) in the dual saw-tooth pulse sequence 408 in FIG. 4 represents target substrate demand at the transfer station.

In this "alternate imaging mode," it is important to note that the second target substrate sheet is demanded approximately 2.5P revolutions of the intermediate substrate after the first target substrate sheet was demanded. This is reflected by saw-tooth pulses 338 and 440 which align with the beginning of transfer station activation pulses TA 1 330 and TB 1 432, respectively. Similarly, the third target substrate sheet is demanded approximately 1.5P revolutions after the second target substrate sheet. This is reflected by saw-tooth pulses 440 and 442, which align with the beginning of transfer station activation pulses TB 1 432 and TA 2 334, respectively. This pattern of odd numbered sheets demanded approximately 2.5P revolutions after even numbered sheets and even number sheets demanded approximately 1.5P revolutions after odd numbered sheets continues until the print job is complete.

Where average demand would be 2P revolutions of the intermediate substrate, the alternating demands of 2.5P and 1.5P revolutions produces less deviation about the average than the alternating demands of 0.5P and 3.5P (FIG. 3). This is perhaps emphasized by applying the example of the drum with a circumference of 565.5 mm (22.25 in.), rotated at 1400 mm/sec. (55 in./sec.) used above. Recall that each pass (P) of the drum is 0.4 sec. in duration. Also recall that under "burst mode" scheduling (FIG. 3) the transfer station alternates between demanding target substrate sheets in 0.2 sec. (0.5P) and 1.4 sec. (3.5P). Here, under FIG. 4 "alternate imaging mode" scheduling, the transfer station alternates between demanding target substrate sheets in 1.0 sec. (2.5P) and 0.6 sec. (1.5P).

Figure 5:
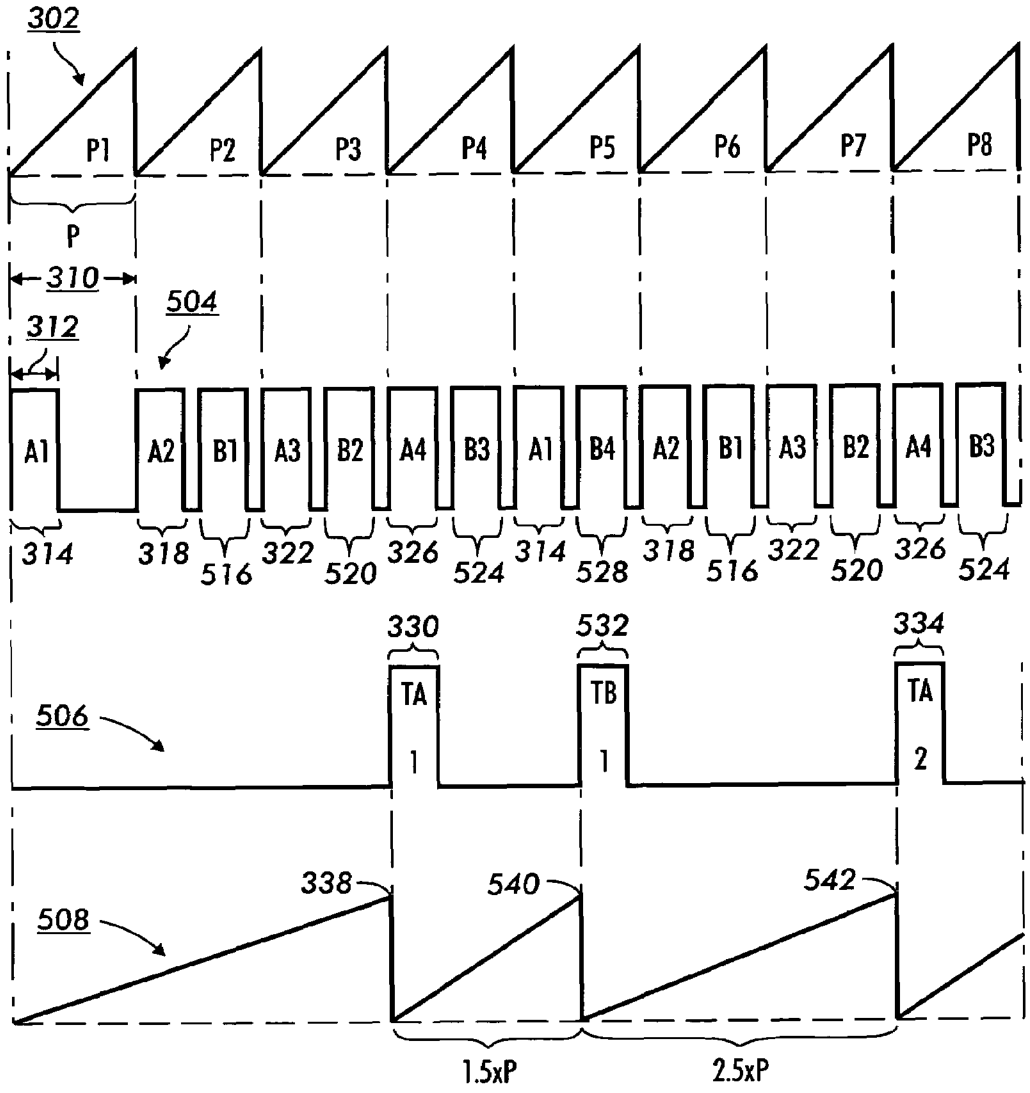
FIG. 5 is a timing diagram for a two-pitch, four-pass marking architecture that schedules print jobs in an "alternate imaging mode" in accordance with an embodiment of the present invention.

Reference is now being made to FIG. 5, showing a timing diagram for a two-pitch, four-pass marking architecture that schedules print jobs in an "alternate imaging mode." As in FIG. 3, FIG. 5 includes periodic saw-tooth waveform 302, square pulse train 504, repeating dual square pulse sequence 506, and repeating dual saw-tooth pulse sequence 508. The diagrams (i.e., 302, 504, 506, and 508) represent the same type of information as the diagrams of FIG. 3. Also, the intermediate substrate moves in the same manner for FIG. 5 as for FIG. 3. Accordingly, the periodic saw-tooth waveform and a pass P 310 of the intermediate substrate in FIG. 5 are identical to that of FIG. 3.

As in FIG. 3, each pulse 312 in the square pulse train 504 of FIG. 5 represents activation of the marking material applicator by the controller. The marking material applicator is activated in basically the same manner as in FIG. 3. Accordingly, FIG. 5 also refers to the two pitch areas 218 on the intermediate substrate as pitch-A and pitch-B with the distinction being that FIG. 5 employs "alternate imaging mode" rather than "burst mode" scheduling.

In this "alternate imaging mode," the applicator begins depositing marking material on pitch-A during pass P1 and delays beginning pitch-B imaging until pass P2 as reflected by applicator activation pulses A1 314 during pass P1. During pass P2, first page imaging continues and the applicator begins depositing marking material on pitch-B as reflected by pulses A2 318 and B1 516. During pass P3, first page and second page imaging continues with pulses A3 322 and B2 520. During pass P4, first page and second page imaging continues with pulses A4 326 and B3 524. During pass P5, second page imaging continues on pitch-B and the applicator begins another identical four-pass cycle for the third page of the print job on pitch-A as reflected by pulses B4 528 and A1 314. The applicator continues to be activated in like fashion until the print job is complete.

As in FIG. 3, each pulse (e.g., 330) in the dual square pulse sequence 506 of FIG. 5 represents activation of the transfer station by the controller. After the start of A4 326, transfer of the pitch-A composite image to a target substrate can begin. Transfer of the pitch-A composite image is performed the same in FIG. 5 as in FIG. 3. This is reflected by transfer station activation pulse TA1 330, which occurs at the same point in FIG. 5 as in FIG. 3. Transfer of the pitch-B composite image to a target substrate can begin after the start of B4 528 as reflected by transfer station activation pulse TB1 532. However, note that in FIG. 5 the applicator activation pulse B4 begins during pass P5 rather than during pass P4 as in FIG. 3. Presuming the print job includes third and fourth pages, the transfer station is activated again in identical fashion after the start of A4 326 in pass P8 and after the start of the fourth marking pass over pitch-B in pass P9 (not shown). Transfer station activation for the third page image is represented by pulse TA2 334.

Also as in FIG. 3, each pulse (e.g., 338) in the dual saw-tooth pulse sequence 508 in FIG. 5 represents target substrate demand at the transfer station. In this "alternate imaging mode," it is important to note that the second target substrate sheet is demanded approximately 1.5P revolutions of the intermediate substrate after the first target substrate sheet was demanded. This is reflected by saw-tooth pulses 338 and 540 which align with the beginning of transfer station activation pulses TA 1 330 and TB 1 532, respectively. Similarly, the third target substrate sheet is demanded approximately 2.5P revolutions after the second target substrate sheet. This is reflected by saw-tooth pulses 540 and 542 which align with the beginning of transfer station activation pulses TB 1 532 and TA 2 334, respectively. This pattern of odd numbered sheets demanded approximately 1.5P revolutions after even numbered sheets and even number sheets demanded approximately 2.5P revolutions after odd numbered sheets continues until the print job is complete.

Where average demand would be 2P revolutions of the intermediate substrate, the alternating demands of 1.5P and 2.5P revolutions in FIG. 5 produce less deviation about the average than the alternating demands of 0.5P and 3.5P in FIG. 3. This is perhaps emphasized by applying the example of the drum with a circumference of 565.5 mm (22.25 in.), rotated at 1400 mm/sec. (55 in./sec.) used above. Recall that each pass (P) of the drum is 0.4 sec. in duration. Also recall that under "burst mode" scheduling (FIG. 3) the transfer station alternates between demanding target substrate sheets in 0.2 sec. (0.5P) and 1.4 sec. (3.5P). Here, under FIG. 5 "alternate imaging mode" scheduling, the transfer station alternates between demanding target substrate sheets in 0.6 sec. (1.5P) and 1.0 sec. (2.5P).

Figure 6:
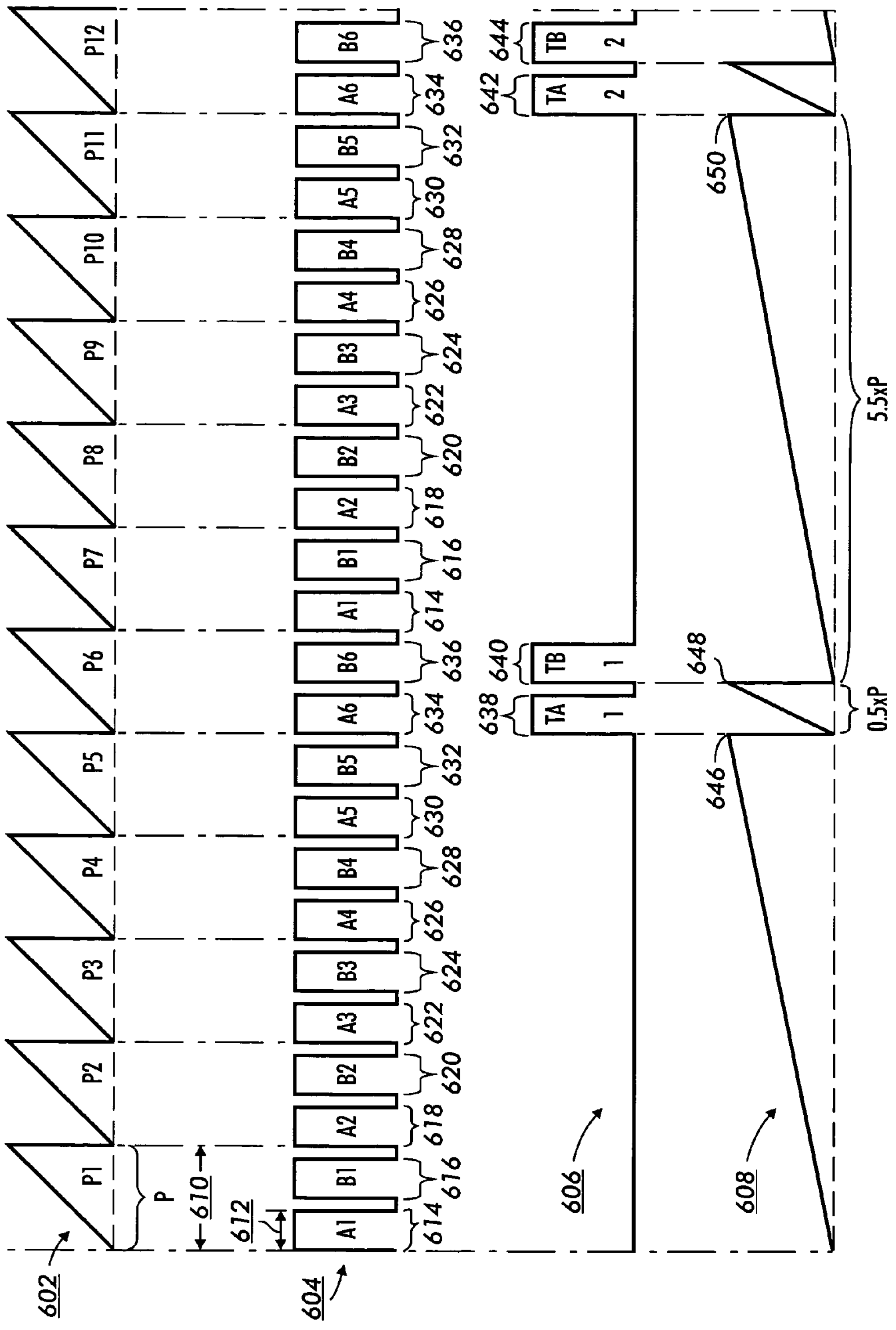
FIG. 6 is a timing diagram for a two-pitch, six-pass marking architecture that schedules print jobs in "burst mode".

Reference is now being made to FIG. 6, showing a timing diagram for a two-pitch, six-pass marking architecture that schedules print jobs in "burst mode". More specifically, FIG. 6 includes periodic saw-tooth waveform 602, square pulse train 604, repeating dual square pulse sequence 606, and repeating dual saw-tooth pulse sequence 608. The periodic saw-tooth waveform represents passes, i.e., revolutions, of the intermediate substrate. The square pulse train represents activation of the marking material applicator by the controller. The repeating dual square pulse sequence represents activation of the transfer station by the controller. The repeating dual saw-tooth pulse sequence represents target substrate demand at the transfer station.

The intermediate substrate begins moving in the process direction 120 at the beginning of a print job in order to begin imaging the first page. Each cycle of the saw-tooth waveform ("P") 610 represents a revolution or pass of the intermediate substrate. The diagram reflects twelve passes (12P), numbered sequentially P1-P12. In actuality, the intermediate substrate continues to move until the print job is complete. A pass (P) is a useful reference for timing operations and will be used in the following discussion for relative and proportional comparisons (e.g., 0.5P, 5.5P).

Returning now to FIGS. 1 and 2, the two-pitch, six-pass marking architecture requires six passes of the marking material applicator over each of the pitch areas to completely mark the composite image. The six passes can either apply six swaths or six color separations of the composite image. Where it is based on six swaths, the desired composite resolution and the resolution of each swath of the applicator are considered. For example, if the desired resolution is 600 dots per inch (dpi), in the six-pass architecture the resolution of the marking material applicator is 100 dpi. After each pass, the applicator is moved in the X, i.e., cross-process, direction by the controller and the resolution of the composite image is 600 dpi from the accumulation of the six 100 dpi swaths. Alternatively, where the six passes apply six color separations, each color separation is applied in successive passes. For example, the applicator may deposit cyan, magenta, yellow, red, green, and blue color separations in successive passes. Other techniques that complete the composite image in six passes are also contemplated, including print systems with multiple marking material applicators.

With reference now again being made to FIG. 6, each pulse 612 in the square pulse train 604 represents activation of the marking material applicator by the controller. In the two-pitch, six-pass marking architecture, the applicator is activated twice during each pass P of the intermediate substrate 104; one activation for each pitch area 218. For consistency, the two pitch areas on the intermediate substrate are again being referred to herein as pitch-A and pitch-B. Furthermore, it is assumed that the applicator encounters pitch-A and then pitch-B during each pass P. In other words, pitch-A represents the first page and subsequent odd pages of a print job and pitch-B represents the second page and subsequent even pages.

In "burst mode," the applicator begins depositing marking material on both pitch-A and pitch-B during pass P1 as reflected by applicator activation pulses A1 614 and B1 616. As first and second page imaging continues, pulses A2 618 and B2 620 represent activation of the applicator during pass P2. Likewise, pulses A3 622 and B3 624 represent activation during pass P3, pulses A4 626 and B4 628 represent activation during pass P4, pulses A5 630 and B5 632 represent activation during pass P5, and pulses A6 634 and B6 636 represent activation during pass P6. After the sixth pass, the applicator begins another identical six-pass cycle for the third and fourth pages of the print job. The applicator continues to be activated in like fashion until the print job is complete.

Each pulse (e.g., 638) in the dual square pulse sequence 606 represents activation of the transfer station by the controller. After the start of A6 634, transfer of the pitch A composite image to a target substrate can begin. Accordingly, a target substrate sheet advancing along the paper path is coordinated to meet with the composite image as it reaches the transfer station. Transfer of the composite image is performed during transfer station activation pulse TA1 638. Note that the duration of pulse TA1 638 is the substantially the same as an applicator activation pulse 612 because the target substrate and the surface of the intermediate substrate are moving at substantially the same speed during the transfer operation. Also note, that in actuality the transfer station activation pulse TA1 638 lags the sixth applicator activation pulse A6. The amount of lag depends on the actual positions of the applicator 102 and the transfer station. For example, in the print system of FIG. 1 the applicator is shown at 2 o'clock and the transfer station at 6 o'clock with respect to the intermediate substrate. This would result in an approximate delay of 0.67P from pulse A6 634 to pulse TA1 638. Each transfer station activation pulse would lag its corresponding sixth applicator application pulse in like fashion. Nevertheless, the present invention is not effected by the delay.

Likewise, after the start of B6 636, transfer of the pitch-B composite image to a target substrate can begin. Accordingly, a second target substrate sheet advancing along the paper path is coordinated to meet the composite image as it reaches the transfer station. Transfer of the composite image is performed during the transfer station activation pulse TB1 640. Presuming the print job includes third and fourth pages, the transfer station is activated again in identical fashion after the start of A6 634 and B6 636 in pass P12. Transfer station activation for the third and fourth page images are represented by pulses TA2 642 and TB2 644, respectively.

Each pulse (e.g., 646) in the dual saw-tooth pulse sequence 608 represents target substrate demand at the transfer station. In "burst mode," it is important to note that the second target substrate sheet is demanded approximately 0.5P revolutions of the intermediate substrate after the first target substrate sheet was demanded. This is reflected by saw-tooth pulses 646 and 648, which align with the beginning of transfer station activation pulses TA 1 638 and TB 1 640, respectively. In contrast, the third target substrate sheet is demanded approximately 5.5P revolutions after the second target substrate sheet 118. This is reflected by saw-tooth pulses 648 and 650, which align with the beginning of transfer station activation pulses TB 1 640 and TA 2 642, respectively. This pattern of odd numbered sheets demanded approximately 0.5P revolutions after even numbered sheets and even number sheets demanded approximately 5.5P revolutions after odd numbered sheets continues until the print job is complete.

The disparity between alternating demands of 0.5P and 5.5P revolutions of the intermediate substrate is perhaps emphasized by the following example. If the intermediate substrate is a drum with a circumference of 565.5 mm (22.25 in.) and the drum is rotated at 1400 mm/sec. (55 in./sec.), each pass (P) is 0.4 sec. in duration and the transfer station alternates between demanding target substrate sheets 118 in 0.2 sec. (0.5P) and 2.2 sec. (5.5P).

Figure 7:
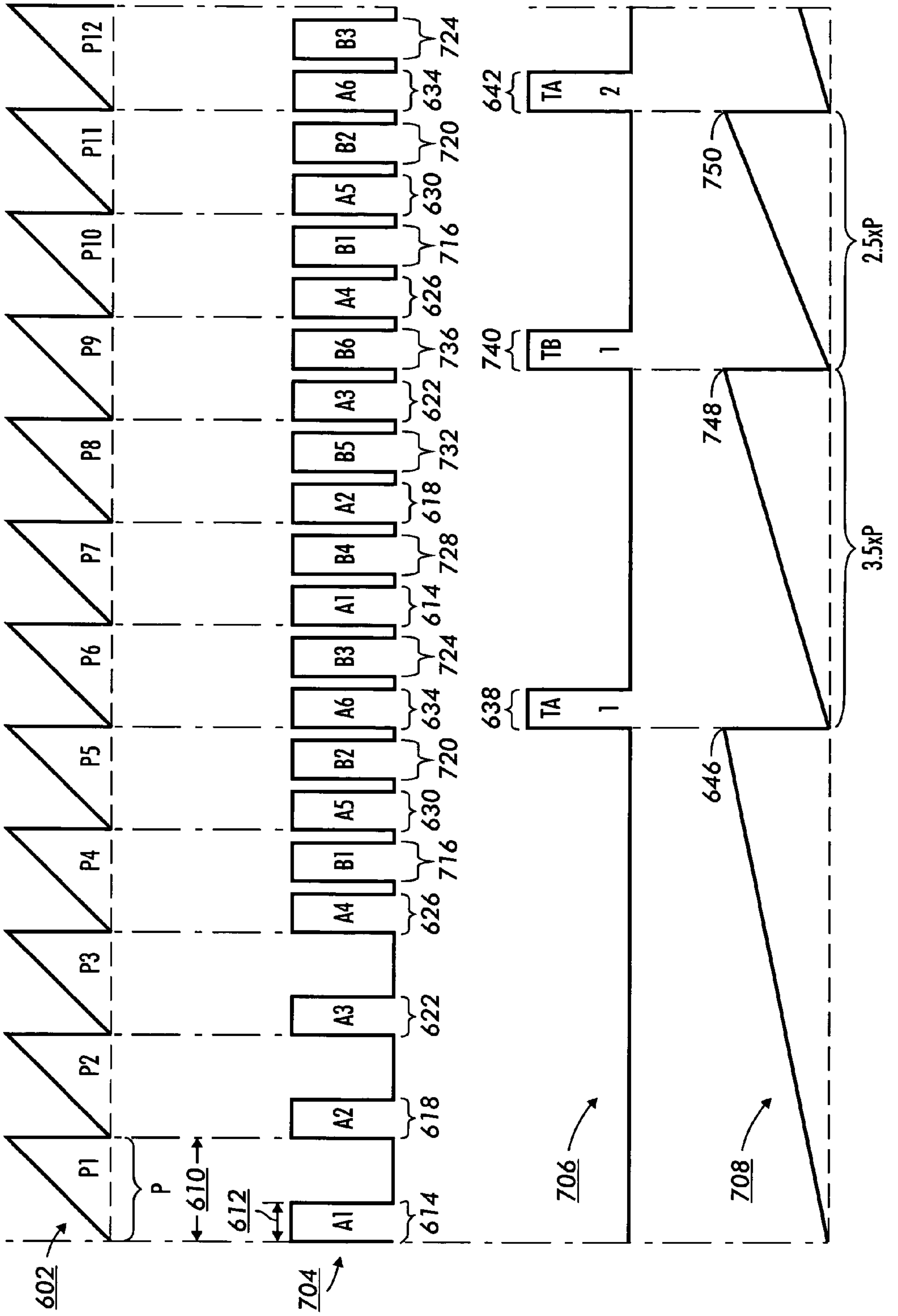
FIG. 7 is a timing diagram for a two-pitch, six-pass marking architecture that schedules print jobs in an "alternate imaging mode" in accordance with an embodiment of the present invention.

Reference is now being made to FIG. 7 showing a timing diagram for a two-pitch, six-pass marking architecture that schedules print jobs in an "alternate imaging mode." As in FIG. 6, FIG. 7 includes periodic saw-tooth waveform 602, square pulse train 704, repeating dual square pulse sequence 706, and repeating dual saw-tooth pulse sequence 708. The diagrams (i.e., 602, 704, 706, and 708) represent the same type of information as the diagrams of FIG. 6.

The intermediate substrate moves in the same manner for FIG. 7 as described for FIG. 6. Accordingly, the periodic saw-tooth waveform 602 and a pass P 610 of the intermediate substrate in FIG. 7 are identical to that of FIG. 6.

Also as in FIG. 6, each pulse 612 in the square pulse train 704 of FIG. 7 represents activation of the marking material applicator by the controller. The marking material applicator is activated in basically the same manner as described in FIG. 6. FIG. 7 also refers to the two pitch areas 218 on the intermediate substrate as pitch-A and pitch-B with the distinction being that FIG. 7 employs "alternate imaging mode" rather than "burst mode" scheduling.

In this "alternate imaging mode," applicator begins depositing marking material on pitch-A during pass P1 and delays beginning pitch-B imaging until pass P4 as reflected by applicator activation pulses A1 614 during pass P1. During passes P2 and P3, first page imaging continues with pulses A2 618 and A3 622, respectively. During pass P4, first page imaging continues and the applicator begins depositing marking material on pitch-B as reflected by pulses A4 626 and B1 716. During pass P5, first page and second page imaging continues with pulses A5 630 and B2 720. During pass P6, first page and second page imaging continues with pulses A6 634 and B3 724. During pass P7, second page imaging continues on pitch-B and the applicator begins another identical six-pass cycle for the third page of the print job on pitch-A as reflected by pulses B4 728 and A1 614. During pass P8, second and third page imaging continues with pulses B5 732 and A2 618. During pass P9, second and third page imaging continues with pulses B6 736 and A3 622. The applicator continues to be activated in like fashion until the print job is complete.

As in FIG. 6, each pulse (e.g., 638) in the dual square pulse sequence 706 of FIG. 7 represents activation of the transfer station by the controller. After the start of A6 634, transfer of the pitch-A composite image to a target substrate can begin. Transfer of the pitch-A composite image is performed the same in FIG. 7 as in FIG. 6. This is reflected by transfer station activation pulse TA1 638, which occurs at the same point in FIG. 7 as in FIG. 6. Transfer of the pitch-B composite image to a target substrate can begin after the start of B6 736. This is reflected by transfer station activation pulse TB1 740. However, note that in FIG. 7 the applicator activation pulse B6 begins during pass P9, rather than during pass P6 as it did in FIG. 6. Presuming the print job includes third and fourth pages, the transfer station is activated again in identical fashion after the start of A6 634 in pass P12 and after the start of the sixth marking pass over pitch-B in pass P15 (not shown). Transfer station activation for the third page image is represented by pulse TA2 642. Also as in FIG. 6, each pulse (e.g., 646) in the dual saw-tooth pulse sequence 708 in FIG. 7 represents target substrate demand at the transfer station.

In this "alternate imaging mode," it is important to note that the second target substrate sheet is demanded approximately 3.5P revolutions of the intermediate substrate after the first target substrate sheet was demanded. This is reflected by saw-tooth pulses 646 and 748, which align with the beginning of transfer station activation pulses TA 1 638 and TB 1 740, respectively. Similarly, the third target substrate sheet is demanded approximately 2.5P revolutions after the second target substrate sheet. This is reflected by saw-tooth pulses 748 and 750, which align with the beginning of transfer station activation pulses TB 1 740 and TA 2 642, respectively. This pattern of odd numbered sheets demanded approximately 3.5P revolutions after even numbered sheets and even number sheets demanded approximately 2.5P revolutions after odd numbered sheets continues until the print job is complete.

Where average demand would be 3P revolutions of the intermediate substrate, the alternating demands of 3.5P and 2.5P revolutions in FIG. 7 produces less deviation about the average than the alternating demands of 0.5P and 5.5P in FIG. 6. This is perhaps emphasized by applying the example of the drum with a circumference of 565.5 mm (22.25 in.), rotated at 1400 mm/sec. (55 in./sec.) used above. Recall that each pass (P) of the drum is 0.4 sec. in duration. Also recall that under "burst mode" scheduling (FIG. 6) the transfer station alternates between demanding target substrate sheets in 0.2 sec. (0.5P) and 2.2 sec. (5.5P). Here, under FIG. 7 "alternate imaging mode" scheduling, the transfer station alternates between demanding target substrate sheets 118 in 1.4 sec. (3.5P) and 1.0 sec. (2.5P).

Figure 8:
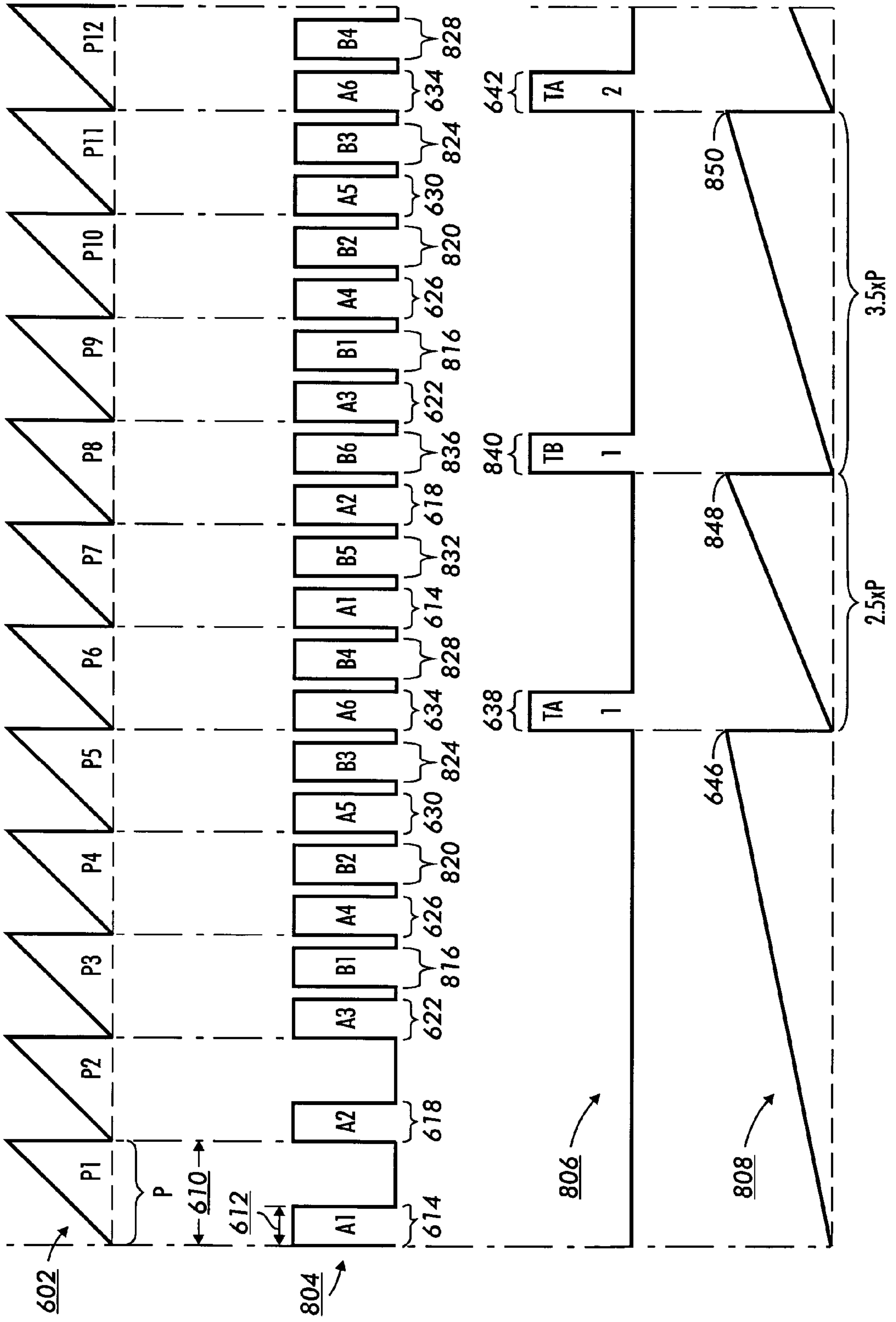
FIG. 8 is a timing diagram for a two-pitch, six-pass marking architecture that schedules print jobs in an "alternate imaging mode" in accordance with an embodiment of the present invention.

Reference is now being made to FIG. 8 showing a timing diagram for a two-pitch, six-pass marking architecture that schedules print jobs in an "alternate imaging mode." As in FIG. 6, FIG. 8 includes periodic saw-tooth waveform 602, square pulse train 804, repeating dual square pulse sequence 806, and repeating dual saw-tooth pulse sequence 808. The diagrams (i.e., 602, 804, 806, and 808) represent the same type of information as the diagrams of FIG. 6.

The intermediate substrate moves in the same manner for FIG. 8 as described for FIG. 6. Accordingly, the periodic saw-tooth waveform 602 and a pass P 610 of the intermediate substrate in FIG. 8 are identical to that of FIG. 6.

As in FIG. 6, each pulse 612 in the square pulse train 804 of FIG. 8 represents activation of the marking material applicator by the controller. The marking material applicator is activated in basically the same manner as described in FIG. 6. Accordingly, FIG. 8 also refers to the two pitch areas 218 on the intermediate substrate as pitch-A and pitch-B with the distinction being that FIG. 8 employs "alternate imaging mode" rather than "burst mode" scheduling.

In this "alternate imaging mode," applicator begins depositing marking material on pitch-A during pass P1 and delays beginning pitch-B imaging until pass P3. This is reflected by applicator activation pulses A1 614 during pass P1. During pass P2, first page imaging continues with pulse A2 618. During pass P3, first page imaging continues and the applicator begins depositing marking material on pitch-B. This is reflected by pulses A3 626 and B1 816. During pass P4, first page and second page imaging continues with pulses A4 626 and B2 820. During pass P5, first page and second page imaging continues with pulses A5 630 and B3 824. During pass P6, first page and second page imaging continues with pulses A6 634 and B4 828. During pass P7, second page imaging continues on pitch-B and the applicator begins another identical six-pass cycle for the third page of the print job on pitch-A. This is reflected by pulses B5 832 and A1 614. During pass P8, second and third page imaging continues with pulses B6 836 and A2 618. The applicator continues to be activated in like fashion until the print job is complete.

Also as in FIG. 6, each pulse (e.g., 638) in the dual square pulse sequence 806 of FIG. 8 represents activation of the transfer station by the controller. After the start of A6 634, transfer of the pitch-A composite image to a target substrate can begin. Transfer of the pitch-A composite image is performed the same in FIG. 8 as in FIG. 6. This is reflected by transfer station activation pulse TA1 638, which occurs at the same point in FIG. 8 as in FIG. 6. Transfer of the pitch-B composite image to a target substrate can begin after the start of B6 836. This is reflected by transfer station activation pulse TB1 840. However, note that in FIG. 8 the applicator activation pulse B6 begins during pass P8, rather than during pass P6 as it did in FIG. 6. Presuming the print job includes third and fourth pages, the transfer station is activated again in identical fashion after the start of A6 634 in pass P12 and after the start of the sixth marking pass over pitch-B in pass P14 (not shown). Transfer station activation for the third page image is represented by pulse TA2 642. Also as in FIG. 6, each pulse (e.g., 646) in the dual saw-tooth pulse sequence 808 in FIG. 8 represents target substrate demand at the transfer station.

In this "alternate imaging mode," it is important to note that the second target substrate sheet is demanded approximately 2.5P revolutions of the intermediate substrate after the first target substrate sheet was demanded. This is reflected by saw-tooth pulses 646 and 848, which align with the beginning of transfer station activation pulses TA 1 638 and TB 1 840, respectively. Similarly, the third target substrate sheet is demanded approximately 3.5P revolutions after the second target substrate sheet. This is reflected by saw-tooth pulses 848 and 850, which align with the beginning of transfer station activation pulses TB 1 840 and TA 2 642, respectively. This pattern of odd numbered sheets demanded approximately 2.5P revolutions after even numbered sheets and even number sheets demanded approximately 3.5P revolutions after odd numbered sheets continues until the print job is complete.

Where average demand would be 3P revolutions of the intermediate substrate, the alternating demands of 2.5P and 3.5P revolutions in FIG. 8 produces less deviation about the average than the alternating demands of 0.5P and 5.5P in FIG. 6. This is perhaps emphasized by applying the example of the drum with a circumference of 565.5 mm (22.25 in.), rotated at 1400 mm/sec. (55 in./sec.) used above. Recall that each pass (P) of the drum is 0.4 sec. in duration. Also recall that under "burst mode" scheduling (FIG. 6) the transfer station alternates between demanding target substrate sheets in 0.2 sec. (0.5P) and 2.2 sec. (5.5P). Here, under FIG. 8 "alternate imaging mode" scheduling, the transfer station alternates between demanding target substrate sheets in 1.0 sec. (2.5P) and 1.4 sec. (3.5P).

In the dynamic precession mode of the present invention, both the lead edge (L.E.) and the trail edge (T.E.) blank borders of each document are first determined by inspecting the input image electronic data to be printed. This is done to determine if these blank borders exceed the minimum design distance (e.g. 5+5 mm). If this is the case then the applicator activation pulse times (e.g. the widths of the "A" square pulses 314, 318, 322 etc. or "B" square pulses 316, 320, 324, etc.) can be reduced either on the L.E. or the T.E. Whereas the pulses that make up a given page must be spaced exactly one pass (e.g. drum revolution) apart in order to maintain image alignment and integrity, it is possible that the pulses corresponding to the printed page subsequent the reduced width pulses can start earlier than otherwise possible. This has the net result of reducing the interdocument zone (IDZ) time with respect to the transferred pages while maintaining the transition time between pulses of successive pages. Another way to look at this is that if the there is a large T.E. border the processes of finishing printing a page is caused to occur sooner and/or if there is a large L.E. border the effective start of the page can happen sooner. This all resulting in the succeeding document being imaged and printed earlier. Because there is still need for transition events to occur in the inter-document and inter-image times (e.g. Drum Maintenance or Transfix Roll Engagement) the transition events timings are also effected. If the T.E. border is being adjusted then the transition events for that IDZ occur sooner. This is as opposed to the L.E. border adjustment where the adjacent IDZ's transition events are unchanged.

When these large T.E. and L.E. borders are taken advantage of it causes a precession of the images about the intermediate substrate where it will be noticed that any subsequent image will be centered in a different location along the intermediate substrate and not as shown in FIGS. 4-8, i.e. succeeding images would be shown as shifted to the left.

Note that in the Alternate Imaging examples of FIGS. 4, 5, 7 and 8 that even though the pages are interleaved, the present technique still allows improved print speeds by allowing the actual start the next image sooner than otherwise expected even though that the first page has not even finished. Notice that this is also the case with the Burst mode (FIGS. 3 and 6) when the T.E. of pitch A and/or L.E. of pitch B are utilized.

This has the advantageous result of generating faster prints per minute with smaller paper to paper timing and identical intermediate substrate pass to pass timing to the nominal design guidelines. This technique varies the page-per-minute (ppm) throughput based on the border margins of each document through timing adjustments. As a result, there are no additional stresses placed on any of the image drum subsystems because process speed remains relatively constant.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for minimizing the Inter-Document Zone (IDZ) in multi-pass printing system architectures, with print engines employing asynchronous paper delivery, and providing control over paper feed and imaging times comprising:

a) receiving input electronic data of an image intended to be printed on a recording medium;

b) inspecting said electronic data to determine a lead edge blank border of said image, the lead edge blank border being a portion of the electronic data of the image corresponding to an area located at a leading edge of the recording medium onto which no marking material is to be deposited, the lead edge blank border having a first dimension parallel to a direction the recording medium is being transported and a second dimension perpendicular to a direction the recording medium is being transported;

c) determining, on a page by page basis, whether a length of the lead edge blank border, in the first dimension, exceeds a predetermined distance; and d) adjusting, on a page by page basis, imaging and paper delivery timing accordingly to increase subsequent printing speed when length of the lead edge blank border, in the first dimension, exceeds a predetermined distance.

2. The method of claim 1 wherein when the lead edge blank border exceeds the predetermined distance, the image corresponding to that page is printed sooner than a nominal situation.

3. The method of claim 1, further comprising:

e inspecting said electronic data to determine a trail edge blank border of said image, the trail edge blank border being a portion of the electronic data of the image corresponding to an area located at a trailing edge of the recording medium onto which no marking material is to be deposited, the trail edge blank border having a first dimension parallel to a direction the recording medium is being transported and a second dimension perpendicular to a direction the recording medium is being transported;

f) determining, on a page by page basis, whether the trail edge blank border exceed a predetermined distance; and g) adjusting, on a page by page basis, imaging and paper delivery timing accordingly to increase subsequent printing speed when the length of the trail edge blank border, in the first dimension, exceeds the predetermined distance such that the image corresponding a subsequent document is printed sooner than a nominal situation.

* * * * *